June 24, 1930.  J. W. UPDIKE  1,767,566
DRIVING CLUTCH
Filed June 9, 1928
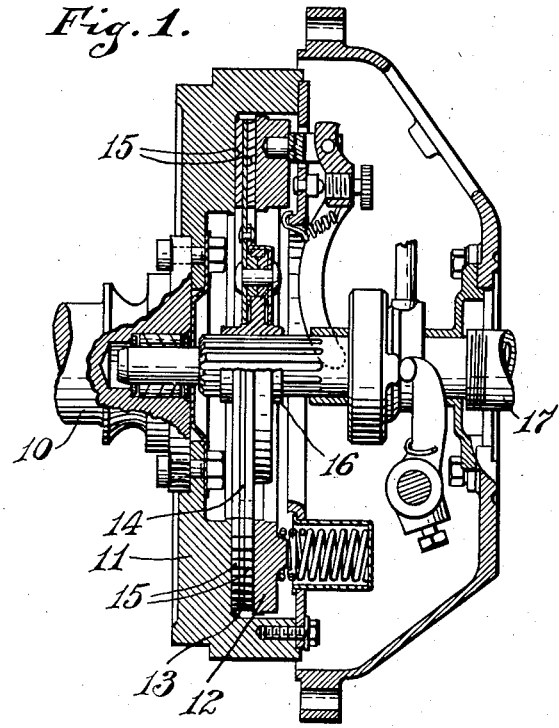
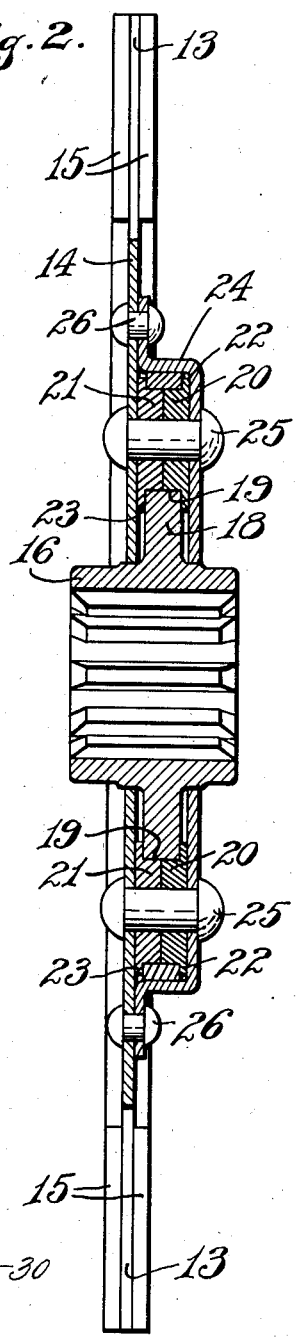
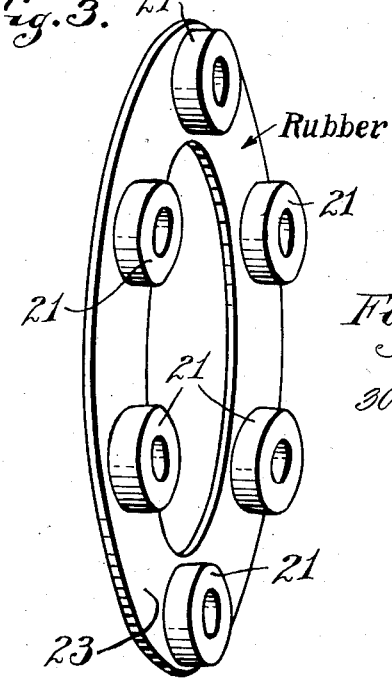
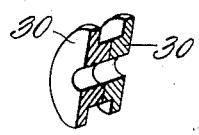
INVENTOR.
James W. Updike,
BY
Hood & Hahn,
ATTORNEYS Patented June 24, 1930

1,767,566

UNITED STATES PATENT OFFICE

JAMES W. UPDIKE, OF INDIANAPOLIS, INDIANA, ASSIGNOR TO MARMON MOTOR CAR COMPANY, OF INDIANAPOLIS, INDIANA, A CORPORATION OF INDIANA

DRIVING CLUTCH

Application filed June 9, 1928. Serial No. 284,257.

The object of my invention is to provide an improved form of friction clutch of the disc type and particularly useful in motor vehicles, of such character as to cushion the mechanical shocks and to damp out the transmission vibrations.

The accompanying drawings illustrate my invention. Fig. 1 is an axial section of a clutch embodying my invention; Fig. 2 is an axial section, on a larger scale, of a fragment, illustrating more clearly the novel feature, Fig. 3 a perspective view of one of the rubber elements, and Fig. 4 a fragmentary detail of the modification.

In the drawings 10 indicates the rear end of the shaft of the internal combustion engine of a motive vehicle, to which is secured the fly-wheel clutch element 11 equipped with the clutch ring 12 and mechanism to control ring 12.

Between element 11 and ring 12 is the segmented rim 13 of a friction disk 14, the segments carrying friction elements 15. All of the above may be of ordinary or desired form.

It has heretofore been customary to rigidly connect disk 14 with a hub similar to hub 16 splined upon the driven shaft 17 and it is at this point that my device departs from established practice.

In my device the hub 16 is provided with a circumferential flange 18 perforated, say at six equally spaced points, at 19. Extended into each perforation 19 from its opposite ends are two rubber axially perforated plugs 20, 21, said plugs being preferably united into companion series by comparatively thin rubber rings 22 and 23 respectively having a radial dimension greater than the plug diameter.

Disk 14 is axially bored to loosely receive hub 16 and is perforated to register with the bores of plugs 20. Secured to disk 14, and bored to loosely receive hub 16, is a shallow cup 24 perforated to register with the bores of plugs 21. The parts being assembled, as shown in Fig. 3, rivets 25 are passed through disk 14, cup 24 and the plugs 20 and 21, and rivets 26 are passed through disk 14 and cup 24 in such manner as to slightly distort the plugs and rings enough to firmly, but elastically, connect disk 14 to the hub 16, space being left to permit slight distortion of the rubber under lateral, circumferential and axial stresses but such as to enable the rubber to transmit the driving torque to shaft 17.

In practice I have found that the described construction operates satisfactorily to transmit the driving torques and at the same time eliminates certain noises and vibrations which are apparently due to slight, and commercially unavoidable, inaccuracy of alignment of shafts and to vibrations and mechanical shocks in the transmission gearing.

The cushioning effect due to the rubber rings 22 and 23 between the faces of flange 18 and disk 14 and cup 24 respectively may be obtained by rubber washers 30 (Fig. 4) instead of the rings connecting the several plugs of each set.

I claim as my invention:

1. A friction clutch member comprising a friction annulus, a hub having a circumferential flange having a series of circumferentially-spaced perforations therethrough, rubber plugs mounted in said perforations, rubber elements arranged on each side of the flange, plates associated with said annulus and upon opposite sides of the flange encasing the rubber, and pins carried by the annulus and passing through the plugs.

2. A friction clutch member comprising a friction annulus, a hub having a circumferential flange having a series of circumferentially-spaced perforations therethrough, rubber plugs mounted in said perforations, rubber elements arranged on each side of the flange, plates associated with said annulus and upon opposite sides of the flange encasing the rubber, and pins carried by the annulus and passing through the plugs, the parts being so arranged as to place the rubber under initial distortion and to partially confine the same.

3. A friction clutch member comprising a hub, a friction annulus, a circumferential element carried by one of said parts and having a series of circumferentially-spaced perforations, rubber plugs arranged in said perforations, casing elements carried by the other of said two first-mentioned parts and encasing the plugs, rubber pads arranged between said casing elements and the said circumferential element, and pins passing through said plugs.

4. A friction clutch member comprising a hub, a friction annulus, a circumferential element carried by one of said parts and having a series of circumferentially-spaced perforations, rubber plugs arranged in said perforations, casing elements carried by the other of said two first-mentioned parts and encasing the plugs, rubber pads arranged between said casing elements and the said circumferential element, and pins passing through said plugs, the parts being so arranged as to place the rubber under initial distortion and partial confinement.

In witness whereof, I, JAMES W. UPDIKE, have hereunto set my hand at Indianapolis, Indiana, this 26th day of May, A. D. one thousand nine hundred and twenty-eight.

JAMES W. UPDIKE.